United States Patent [19]

Perry

[11] Patent Number: 4,975,022
[45] Date of Patent: Dec. 4, 1990

[54] HELICOPTER ROTOR BLADES

[75] Inventor: Frederick J. Perry, Yeovil, England

[73] Assignee: Westland Helicopter Limited, Yeovil, England

[21] Appl. No.: 371,848

[22] Filed: Jun. 27, 1989

[30] Foreign Application Priority Data

Jul. 5, 1988 [GB] United Kingdom ............... 8815955

[51] Int. Cl.$^5$ ............... B64C 27/46; B64C 23/00
[52] U.S. Cl. ............... 416/228 R; 244/17.11; 244/198
[58] Field of Search ............... 416/228 A, 228 R; 244/17.11, 6, 7 A, 91, 198, 199

[56] References Cited

U.S. PATENT DOCUMENTS

| | | | |
|---|---|---|---|
| 3,822,105 | 7/1974 | Jepson | 416/228 A |
| 4,324,530 | 4/1982 | Fradenburgh et al. | 416/236 A |
| 4,334,828 | 6/1982 | Moffitt | 416/228 A |
| 4,451,206 | 5/1984 | Philippe et al. | 416/228 A |
| 4,477,042 | 10/1984 | Griswold, II | 244/91 |

Primary Examiner—Edward K. Look
Assistant Examiner—Hoang Nguyen
Attorney, Agent, or Firm—Larson & Taylor

[57] ABSTRACT

The swept extreme tip edge of a helicopter rotor blade incorporates blade droop to reduce aerodynamic pitching moments caused by spanwise flow encountered in the fore and aft sectors of a rotor rotational disc during forward flight of a helicopter on which the blade is fitted.

18 Claims, 5 Drawing Sheets

□ Unmodified swept tip
○ Tip incorporating 20 degree planar anhedral droop
△ Tip incorporating conical camber droop

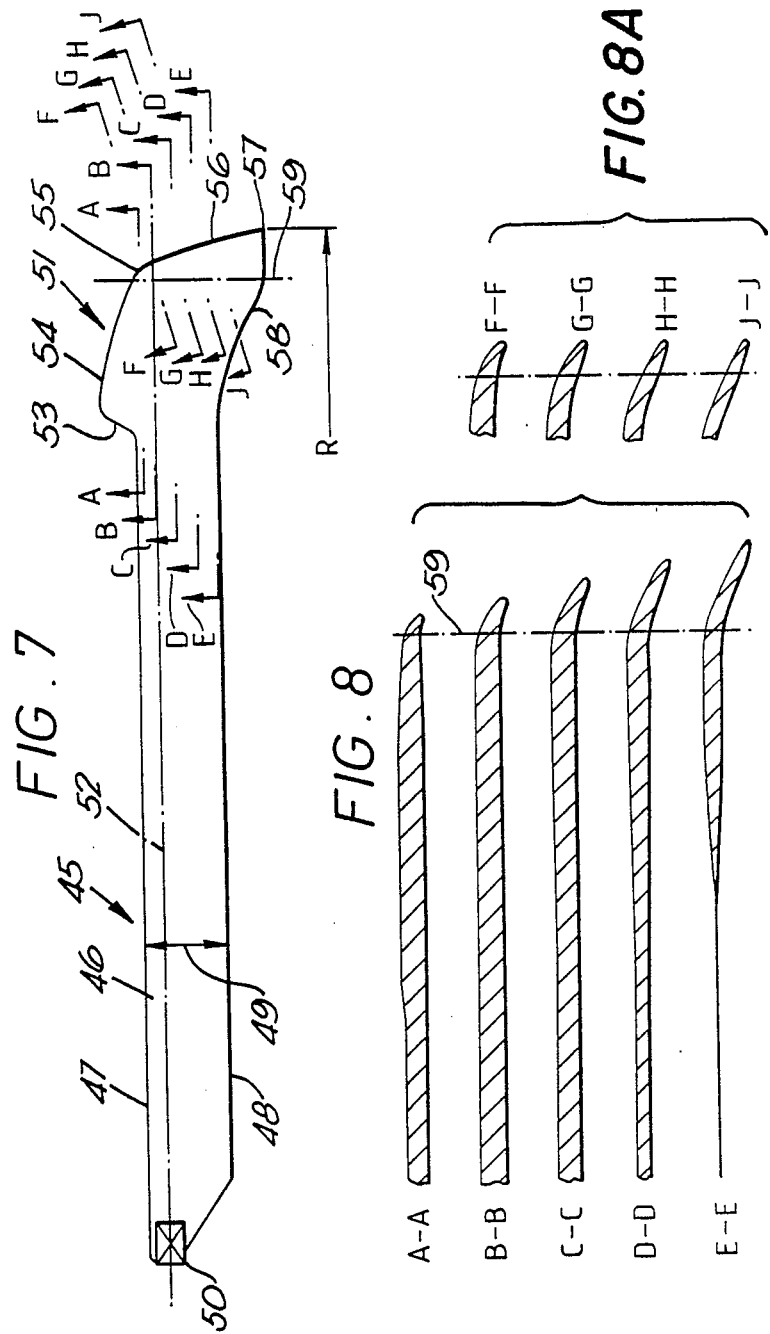

HELICOPTER ROTOR BLADES

1. Field of the Invention

This invention relates to helicopter rotor blades and is particularly concerned with helicopter main sustaining rotor blades.

2. Description of the Prior Art

GB-A-No. 1538055 discloses a helicopter main sustaining rotor blade having a tip planform geometry which is characterised at least in part by a highly swept extreme tip edge which acts as an extension of a swept leading edge for controlling a leading edge vortex when operating at high angles of attack. Such a rotor blade has proved highly successful in producing large increases in the allowable rotor operating envelope, and was a significant factor in the establishment of the of the world absolute speed record for helicopters of 249.10 mph (400.81 km/hr) set by a Westland Lynx helicopter in 1986.

However, it has been discovered that sources of aerodynamic pitching moment which cause an increase in vibratory control loads are associated with a rotor blade having a highly swept extreme tip edge. The pitching moments act primarily in the forward and aft sectors of the rotor disc in forward flight and take the form of a primarily first harmonic vibratory load which acts to twist the blade nose-down over the helicopter nose and nose up over the helicopter tail. Unfortunately, these moments act to reinforce the once-per-revolution aerodynamic moments which arise all along the helicopter sustaining rotor blade due to the cyclic rate of change of aerofoil incidence in forward flight.

U.S. Pat. Nos. 4,324,530 and 4,334,828 both disclose helicopter rotor blades having a swept tip portion characterised by a moderate leading edge sweep and an unswept extreme tip edge. Both proposals utilise a constant span anhedral in order to displace the trailing edge vortices which form the rotor wake downwardly away from the following blade in order to improve the hover performance of a helicopter on which the blades are fitted.

As noted, the blades of the prior proposals do not utilise a highly swept extreme tip edge such as that which characterises the blade of the aforementioned GB-A-No. 1538055. Not surprisingly, therefore, the prior specifications do not recognise the aforementioned problem associated with the use of rotor blades having a highly swept extreme tip edge in the fore and aft sectors of the rotor disc in forward flight, and do not address possible solutions thereto.

U.S. Pat. No. 3,411,738 discloses an anhedral tip which diverges from a leading edge to a trailing edge; however, specifically the tip span dimension is small in comparison with a tip chord dimension which, as will appear, is not the case in the present invention. The tip is particularly described with reference to use on a fixed wing aerofoil which of course is not subjected to pitching moments experienced by helicopter rotor blades, and is in any case again concerned to reduce a trailing vortex and to deflect it downwardly.

SUMMARY OF THE INVENTION

It is an objective of this invention to provide a helicopter main sustaining rotor having a swept extreme tip edge in which the aforementioned aerodynamic pitching moments are reduced or eliminated.

Accordingly, in one aspect, this invention provides a helicopter rotor blade having a root end adapted for attachment to a rotor head, a central portion extending from the root end and being of aerofoil section having leading and trailing edges and a chord dimension and a swept tip at the end of the central portion opposite the root end and defining a blade span, the swept tip including a swept extreme tip edge, characterised in that the swept extreme tip edge incorporates blade droop to alter the bound vortex distribution caused by spanwise airflow over the swept extreme tip edge so as to reduce aerodynamic pitching moments of the blade in the fore and aft sectors of a rotor rotational disc during forward flight of a helicopter on which the blade is fitted.

In one embodiment the blade droop may comprise a planar anhedral blade droop and in an alternative embodiment may comprise a conical camber blade droop, both as hereinafter defined.

The blade droop profile may be defined by projecting the blade tip planform shape onto a droop surface comprised of droop lines of geometrically similar shape located in planes parallel to a blade feathering axis and extending between a first chordwise reference axis inboard of the blade tip and a second chordwise reference axis outboard of said first axis.

The first reference axis may be perpendicular to the blade feathering axis and may located at about the 95 percent blade span station.

The second reference axis may be located perpendicular to the blade feathering axis and may be located at the 100 percent blade span station.

Alternatively, the second reference axis may be located at an angle to the blade feathering axis so as to intersect when extended said first reference axis at a point ahead of said blade leading edge. Conveniently, in such an embodiment, the angle of said second reference axis is substantially the same as the angle of sweep of the swept extreme tip edge and may be coincident therewith.

The droop surface may be planar, and may extend downwardly and outwardly from the first reference axis and at an angle of about 20 degrees. Alternatively the droop surface may be curved.

The angle of sweep of the swept extreme tip edge may be between 55 and 85 degrees from the blade feathering axis and preferably may be about 70 degrees from the blade feathering axis.

In another aspect the invention provides a helicopter rotor blade having a root end adapted during operation for attachment to a rotor head for rotation about a generally vertical axis to define a rotor rotational disc, a central portion extending from the root end and being of aerofoil section having leading and trailing edges and a chord dimension, a swept tip at the end of the central portion defining a blade span and including a swept extreme tip edge, characterised in that blade sections taken perpendicular to said swept extreme tip edge comprise aerofoil sections incorporating a predetermined swept extreme tip edge droop that determines the airflow characteristics about the swept tip to reduce aerodynamic pitching moments that occur due to spanwise flow encountered in the fore and aft sectors of the rotor disc during forward flight of a helicopter on which the rotor blade is fitted.

In yet another aspect the invention provides a helicopter rotor blade comprising a root end adapted for attachment to a rotor head for rotation, during operation, about a generally vertical axis so as to define a rotor rotational disc, a central portion extending from the root end and being of aerofoil section having leading and trailing edges and a chord dimension, a swept tip at the end of the central portion opposite the root end, the swept tip having a first leading edge portion extending forwardly from a junction with the leading edge of the central portion to a first point located forward of the leading edge of the central portion, a second leading edge portion swept rearwardly from the first point to a second point, a rearwardly swept extreme tip edge of higher sweep magnitude than the second leading edge portion and extending to a third point, a curved joining portion blending the second leading edge portion with said tip edge, and a rearwardly swept trailing edge extending from a junction with the trailing edge of the central portion to the third point, the swept tip having a chord dimension longer than the chord dimension of the central portion, and an outer area of the tip being progressively reduced in thickness towards the swept extreme tip edge, characterised in that the swept tip is deflected downwardly in the region of the swept extreme tip edge to reduce aerodynamic pitching moments that occur due to spanwise flow encountered in the fore and aft sectors of the rotor disc during forward flight of a helicopter on which the rotor blade is fitted.

The second leading edge portion may commence at about 0.87R blade station and said downwardly deflected swept extreme tip edge may commence at about 0.95R blade station.

BRIEF DESCRIPTION OF THE DRAWINGS

The invention will now be described by way of example only and with reference to the accompanying drawings in which.

FIG. 7 is a plan view of a rotor blade constructed according to one embodiment of the invention, and FIG. 8 comprises section views taken on various section lines of FIG. 7.

DETAILED DESCRIPTION OF THE DRAWINGS

Figure 1:
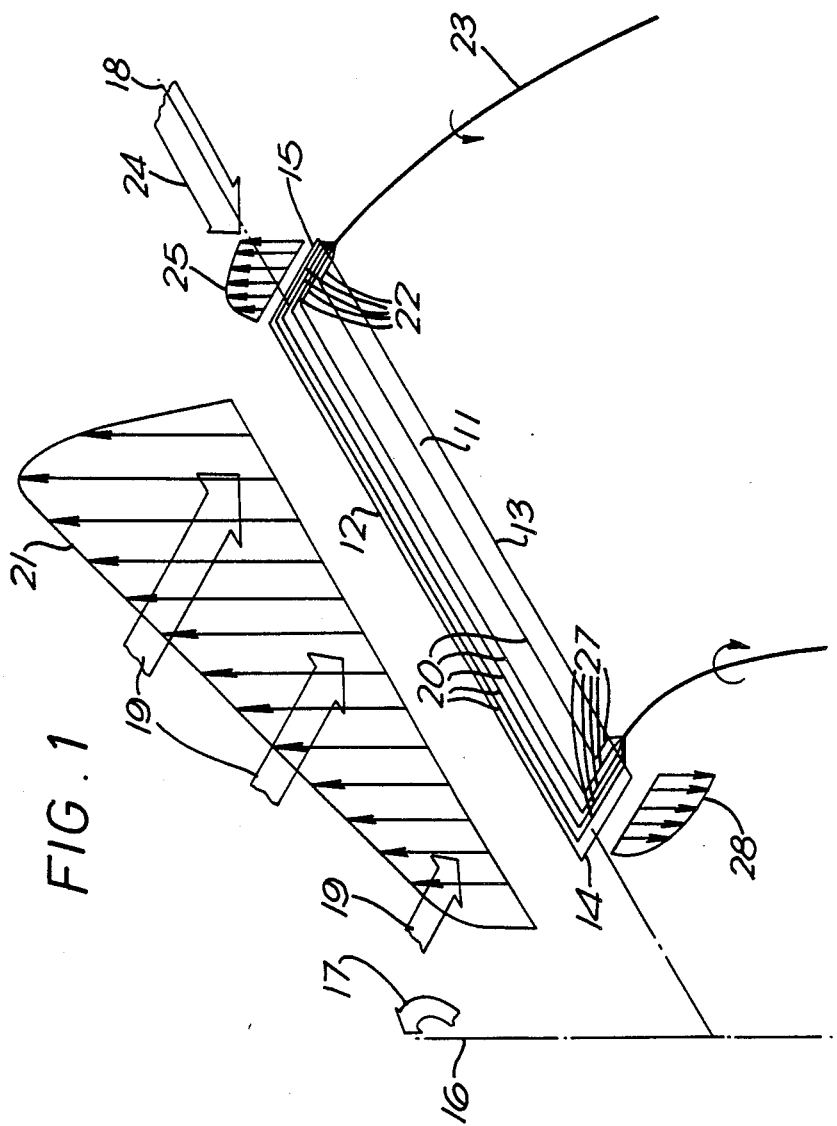
FIG. 1 is a diagram showing the generation of blade pitching moments due to spanwise flow in a rotor blade having an unswept extreme tip edge.

Referring now to FIG. 1, a helicopter main sustaining rotor blade shown diagrammatically at 11 includes a leading edge 12 and a trailing edge 13 defining therebetween a blade chord, a root end 14 and an unswept extreme tip edge 15. The blade is mounted for rotation about a generally vertical axis 16 in the direction indicated by arrow 17 to define a rotor rotational disc and has a feathering axis 18 located at about 25 percent chord dimension.

To assist an understanding of the mechanism that causes the aforementioned undesirable aerodynamic pitching moments it is useful to visualise rotor blade 11 as a lifting surface of bound vortex elements of equal strength. The main component of loading on blade 11 is determined by the incidence of the air flow approaching perpendicular to the leading edge 12 of the blade as indicated by arrows 19 and having a velocity component $V_N$, and the lifting action of blade 11 is represented by a distribution of spanwise bound vortex elements 20 of equal strength $\Gamma$ concentrated towards the leading edge 12 of blade 11 as shown. This concentration is because the centre of lift due to incidence on rotor blades at positions remote from the tip and other discontinuities is approximately the quarter chord, and the area ahead of the quarter chord should contain as many vortex elements as the area behind it to represent the lift.

Local lift is given by the product of the air density ($\rho$) times the air velocity component ($V_N$) perpendicular to the bound vortex elements 20 times the strength ($\Gamma$) of the bound vortex elements 20, and the resulting normal lift distribution ($\Sigma \rho V_N \Gamma$) is indicated at 21 in FIG. 1. It is to be noted that for the purposes of this explanation the normal lift distribution 21 is assumed to give constant strength for the spanwise bound vortex elements 20 so as not to cause unnecessary complication of the illustration.

As the bound vortex elements 20 approach the blade tip 15 they turn towards the trailing edge 13 as bound vortices indicated at 22 in FIG. 1 whose combined strength increases towards the blade trailing edge 13.

As the bound vortices 22 leave the trailing edge 13 they combine to form a trailing tip vortex 23 the strength of which is equal to the sum of the strengths of the individual elements from which it is formed (i.e. $\Gamma\Sigma$), and which is free to move with the airflow.

In forward flight, the bound vortices 22 encounter an air flow velocity component ($V_S$) perpendicular to their direction due to the spanwise airflow 24 encountered by a rotor blade over the nose and tail of the helicopter due to translational motion of the helicopter. This generates a local lift loading distribution 25 concentrated adjacent the tip 15 and centred rearwardly of the feathering axis 18 and which is given by the product of the air density times the air velocity component perpendicular to the bound vortex elements 22 times the strength of the elements 22 (i.e. $\rho \Sigma V_S \Gamma$).

Over the nose of the helicopter the spanwise velocity direction relative the rotor blade 11 is as shown at 24 in FIG. 1 and, since the resulting lift distribution 25 is centred well aft of the blade feathering axis 18, it causes an associated nose-down moment about the feathering axis 18 at the blade tip 15. When the blade 11 is over the tail of the helicopter the spanwise velocity direction 24 relative the blade 11 is reversed and a nose-up moment results.

Thus, the once-per-revolution variation in spanwise velocity gives rise to a once-per-revolution pitching moment.

However, as shown in FIG. 1, the spanwise bound vortex elements 20 also turn towards the trailing edge 13 adjacent the root end 14 of the blade 11 as indicated at 27 resulting in an equal and opposite local lift loading distribution 28 and an equal and opposite associated moment at the blade root 14 that cancels exactly the moment at the blade tip 15 for blades 11 with an unswept extreme tip edge 15.

Figure 2:
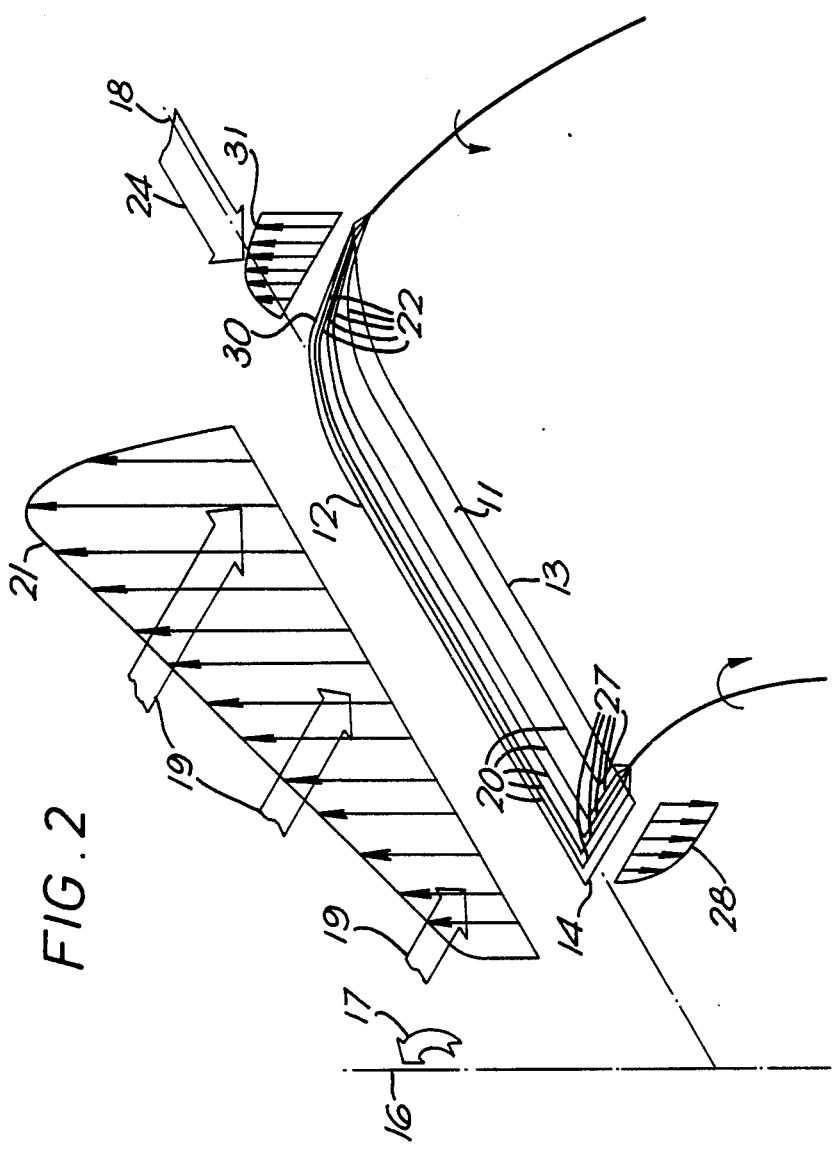
FIG. 2 is a diagram similar to FIG. 1 for a rotor blade having a swept extreme tip edge.

This balance is destroyed if the blade 11 incorporates a swept extreme tip edge and this is indicated in FIG. 2 in which like reference numerals are used to indicate parts similar to those of FIG. 1.

In FIG. 2 the blade 11 has a highly swept extreme tip edge 30 resulting in an increase in the length of the bound vortex elements 22 in the chordwise direction compared to those of FIG. 1. This generates a lift loading distribution indicated at 31 extended further rearward from the feathering axis 18 than the comparable lift loading distribution 25 of FIG. 1, and also further rearward than the opposite lift loading distribution generated at the root 14 of the rotor blade 11 and indicated at 28.

Consequently, the moments about the feathering axis 18 generated by load distributions 31 and 28 at the tip 30 and root 14 respectively no longer cancel, resulting in a net nose-down blade tip moment when the blade 11 is over the nose of the helicopter and a net nose-up blade tip moment when the blade 11 is over the tail of the helicopter.

This net out of balance moment increases as the angle of sweep of the extreme tip edge increases because the spanwise loading distribution tends to be maintained even though the planform area reduces quickly towards an extreme blade tip with the result that the lift loading distribution 31 becomes further offset rearwardly from the feathering axis 18.

The advantages of a rotor blade having a planform geometry as disclosed in GB-A-No. 1538055 when operating under the high angle of attack conditions of the retreating blade in high speed forward flight are derived from the leading edge vortex which forms over the extreme swept tip edge and which extends forward along the edge as the angle of attack increases and provides a stable separated flow to prevent conventional stalling. Whilst the vortex allows operation of such a blade to very high angles of attack (typically 20 degrees), without stalling, its presence is associated with a significant increase in drag, and whilst a drag penalty is acceptable on the retreating blade where dynamic head is low, resulting in a modest power penalty, significant leading edge separation and high drag cannot be tolerated in other azimuth positions.

In respect of its ability to operate to high angles of attack the rotor blade having a highly swept extreme tip edge operates in much the same way as a slender delta wing on a fixed wing aircraft. Extending this analogy, it is usual to camber or droop the leading edge of a delta wing to delay the onset of separated flow to angles of attack beyond that of the cruise condition and to incline the local vortex lift vector, which acts perpendicularly to the local wing surface, forward to reduce drag when flow separation finally develops.

Whilst studying the consequences of the application of a development of the delta wing camber technique to a helicopter rotor blade in forward flight the inventor discovered that the introduction of droop to the extreme swept tip edge of a helicopter rotor blade could assist in controlling the undesirable aerodynamic pitching moments originating from the swept extreme tip edge. Thus, as previously explained, the unbalanced tip moment is a result of the product of the strength of the vortex element and the spanwise flow component, so that if the vortex element could be altered the resulting out of balance moment would also be changed. Remembering that the local vortex element strength is an expression of the strength of the conventional component of loading due to incidence perpendicular to the local leading edge, the inventor realised that the bound vortex distribution at the tip extremity of a helicopter rotor blade could be altered by deflecting out of plane the highly swept extreme tip edge. It seemed that if the swept extreme tip edge was deflected downwardly, local incidence would be reduced when the blade is over the nose of the helicopter and should result in a reduction in the strength of the vortex element to either reduce or reverse the aforementioned undesirable out of balance moment. Similarly, it seemed possible that the opposite would occur with the modified blade over the tail of the helicopter with similar beneficial results.

Two basic forms of extreme swept tip edge droop on a helicopter rotor blade were investigated, namely, anhedral and conical camber, and two variations of the former were considered. These forms of blade droop when applied to a helicopter rotor blade having a highly swept extreme tip edge will now be described with reference to FIGS. 3, 4 and 5 in which a rotor blade is shown diagrammatically as a flat plate which is assumed would be coincident with a chord line of an actual rotor blade. Like reference numerals are used to indicate similar parts.

A rotor blade 32 has a leading edge 33, a trailing edge 34 and a swept tip portion 35 shown in an undrooped position in broken outline and having a swept extreme tip edge 36. The blade has a feathering axis 37 coincident with a 25 percent chord.

Figure 3:
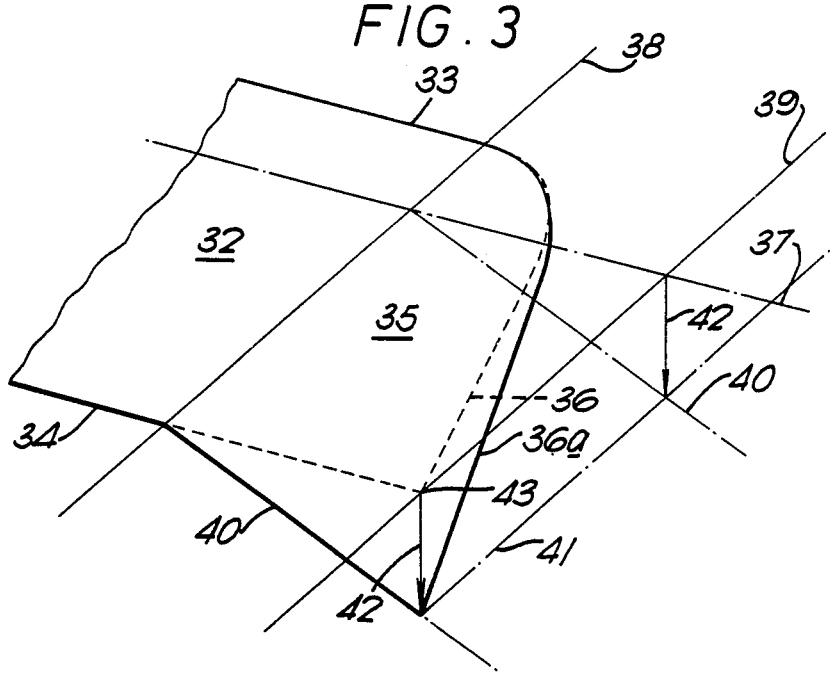
FIGS. 3, 4 and 5 are diagrams illustrating the formation of blade droop at the swept extreme tip edge according to several embodiments of the invention.

A first reference axis 38 located at about 95 percent blade span extends across the blade chord perpendicular to the feathering axis 37, and a second reference axis 39 at 100 percent blade span is located parallel to axis 38, i.e. also perpendicular to feathering axis 37. Planar droop line 40 indicated in two places on FIG. 3 is located parallel to blade feathering axis 37 and extends downwardly and outwardly from the first axis 38 to terminate at a third reference axis 41 spaced-apart downwardly from the second axis 39 by a dimension indicated at 42 corresponding to a maximum desired deflection at the extreme tip 43 of the blade tip portion 35. The droop line 40 defines a constant downwardly extending droop surface across the blade chord and, whilst the proportions are similar, the actual dimension of the resulting droop surface along lines parallel to the feathering axis 37 is proportional to the dimension between reference axes 38 and 39. In the embodiment of FIG. 3 the axes 38 and 39 are parallel and the length of the resulting droop surface is therefore constant.

The shape of the blade tip portion 35 is projected onto the droop surface to define the droop profile of the tip portion along the swept tip edge 36 as indicated by full line 36a in FIG. 3. As will be clear from FIG. 3, the amount of the displacement of tip edge 36a and indicated at 42 reduces towards the leading edge 33 of the blade, and the resulting blade droop is termed herein a planar anhedral droop.

Figure 4:
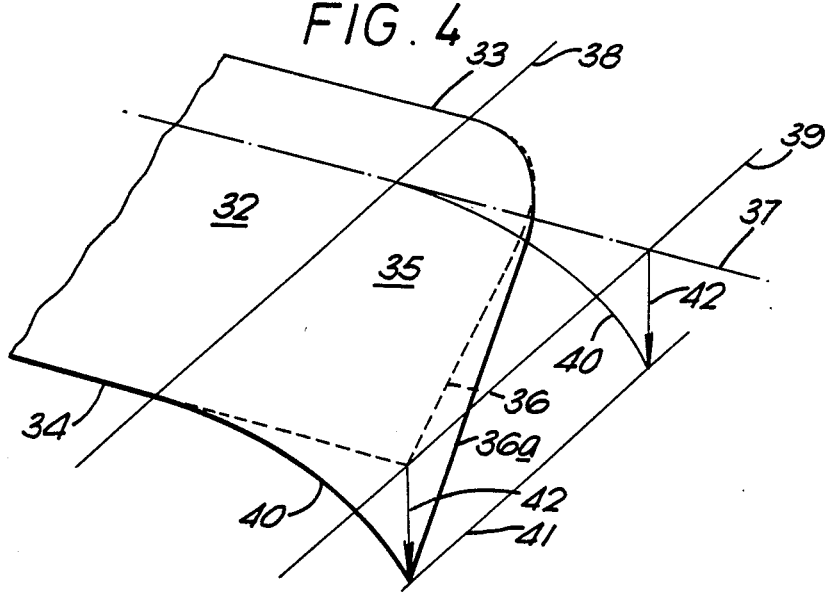

The diagram of FIG. 4 is similar to that of FIG. 3 except that the droop line 40 is a gently downwardly curved line resulting in a maximum deflection 42 similar to that of FIG. 3, and the resulting curved droop surface is termed herein a curved anhedral droop.

Figure 5:
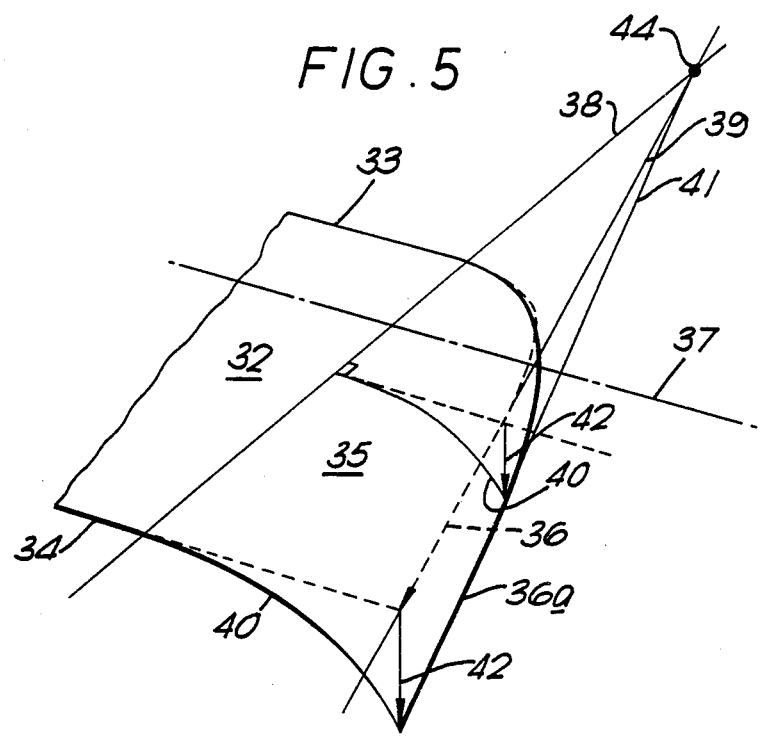

In the diagram of FIG. 5, reference axis 39 is located at an angle to feathering axis 37 that corresponds to the angle of sweep of the extreme tip edge 36 and which, if extended, would cross axis 38 at a point 44 located ahead of the leading edge 33 of blade 32. Curved droop line 40 again provides a gentle downwardly curving droop surface; however in this configuration the third reference axis 41 also extends through point 44 so that the actual length of the droop surface 40 and dimension 42 both reduce towards the blade leading edge 33 due to the converging axes 38, 39 and 41.

Axes 38, 39 and 41 define a conical shape in the embodiment of FIG. 5, and this conical curved droop surface is termed herein a conical camber droop.

It will be apparent that the resulting blade tip portion geometry differs only in detail whether an anhedral or conical camber approach is used in a particular embodiment, since both produce aerofoil sections perpendicular to the extreme swept tip edge incorporating a predetermined swept tip edge droop. This is an important feature of the invention especially for rotor blades having a highly swept extreme tip edge since it is the blade shape in a direction perpendicular to the tip edge that determines whether the air flows smoothly around the edge or forms a separated flow.

Whilst several configurations of extreme tip edge droop have been described it is to be understood that any geometry forming a droop along a highly swept extreme tip edge is useful in reducing undesirable aerodynamic pitching moments in forward flight.

Figure 6:
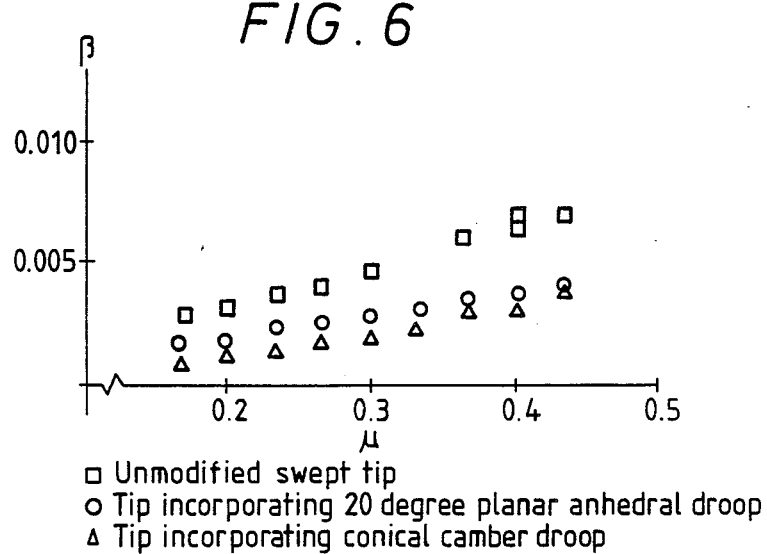
FIG. 6 is a graph comparing the measured first harmonic control load coefficient for helicopter rotor blades with and without the invention.

Wind tunnel tests of a model rotor fitted with rotor blades having a tip shape as disclosed in GB-A-No. 1538055 and modified to incorporate planar anhedral droop and conical camber droop as hereinbefore defined in the region of the extreme swept tip edge throughout the outer 5 percent of blade span have been completed, and the results are illustrated in the graph of FIG. 6 which plots first harmonic control load coefficient indicating the once-per-rev blade torsional moment ($\beta$) against advance ratio ($\mu$). The results show clearly that the incorporation of both planar anhedral droop (20 degree) and conical camber droop reduce the once-per-rev blade torsional moments associated with the extreme swept tip edge.

Referring now to FIG. 7, a helicopter main sustaining rotor blade 45 includes a central portion 46 of aerofoil section having a leading edge 47, a trailing edge 48 and a chord dimension 49. The blade is completed by an inboard root end 50 adapted for attachment to a rotor head (not shown) and a rearwardly swept tip 51. The blade 45 has an operating radius R measured from a generally vertical axis of rotation (not shown) to the outermost extremity of tip 51, and a blade feathering axis 52 coincident with a 25 percent chord line.

The rearwardly swept tip 51 has a planform geometry similar to that disclosed in the embodiment of FIGS. 2 and 3 of the aforementioned patent specification GB-A-No. 1538055, and thus includes a curved forwardly extended leading edge portion 53, a curved rearwardly swept leading edge portion 54 commencing at about 0.87R and having a sweep angle relative the feathering axis 52 progressively increasing to 30 degrees. A curved portion 55 blends leading edge portion 54 with a linear extreme swept tip edge 56 having a sweep angle of 70 degrees relative feathering axis 52 and terminating at point 57 intersected by a generally rearwardly swept blended trailing edge portion 58.

Rotor blade 45 has a 20 degree planar anhedral droop incorporated along the extreme highly swept tip edge 56 according to this invention, and to illustrate the resultant configuration of the blade tip, section lines A—A to E—E are shown at various chord stations parallel to feathering axis 52 and section lines F—F, G—G, H—H and J—J are shown located perpendicular to edge 56 where section lines B—B, C—C, D—D and E—E intersect edge 56.

The anhedral extends outwardly from a 95 percent span station (0.95R) 59 taken perpendicular to blade feathering axis 52.

The resultant extreme tip edge shapes at all of the sections are shown in FIG. 8 which serves to illustrate as aforementioned that the resulting sections are similar whether they are taken perpendicular to the leading edge or parallel to the feathering axis. Consequently, conical camber and anhedral can be considered to be particular forms of the same type of blade droop geometry and are indistinguishable in terms of moment control effect and their effects on flow around the local extreme swept tip edge.

Whilst several embodiments have been described and illustrated it will be understood that many modifications may be made without departing from the scope of the invention. For example the location and angular relationship of the reference axes 38 and 39 can be varied and whilst the first axis 38 will always be within the blade span, the second axis may be located externally thereof. The angle or geometrical shape of the droop lines 40 can be modified to suit particular applications. The angle of sweep of the swept extreme tip edge may comprise either an actual or mean angle and may be between 55 and 85 degrees from a blade feathering axis.

What is claimed is:

1. A helicopter rotor blade having a root end adapted for attachment to a rotor head, a central portion extending from the root end and being of aerofoil section having leading and trailing edges, a cord dimension and a feathering axis, and a swept tip at the end of the central portion opposite the root end and defining a blade space, the swept tip including a swept extreme tip edge having a sweep angle between 55 and 85 degrees from the feathering axis, wherein the swept extreme tip edge droops downwardly to minimize an undesirable effect of spanwise airflow encountered in the fore and aft sectors of a rotor rotational disc during forward flight of a helicopter in which the blade is fitted by reducing the strength of local chordwise bound vortices over the swept extreme tip edge and resulting undesirable aerodynamic pitching moments.

2. A rotor blade as claimed in claim 1, wherein the blade droop comprises a planar anhedral blade droop.

3. A rotor blade as claimed in claim 1, wherein the blade droop comprises a planar anhedral blade droop.

4. A rotor blade as claimed in claim 1, wherein the blade droop profile is defined by projecting the blade tip planform shape onto a droop surface comprised of droop lines of geometrically similar shape located in planes parallel to a blade feathering axis and extending between a first chordwise reference axis inboard of the blade tip and a second chordwise reference axis outboard of said first axis.

5. A rotor blade as claimed in claim 4, wherein said first reference axis is perpendicular to a blade feathering axis.

6. A rotor blade as claimed in claim 5, wherein said first reference axis is located at about 95 percent blade span station.

7. A rotor blade as claimed in claim 4, wherein said second reference axis is perpendicular to the blade feathering axis.

8. A rotor blade as claimed in claim 7, wherein the second reference axis is located at the 100 percent blade span station.

9. A rotor blade as claimed in claim 4, wherein said second reference axis is located at an angle to the blade feathering axis so as to intersect when extended said first reference axis at a point ahead of said blade leading edge.

10. A rotor blade as claimed in claim 9, wherein the angle of the second reference axis is substantially the same as the angle of sweep of the swept extreme tip edge.

11. A rotor blade as claimed in claim 10, wherein said second reference axis is coincident with said swept extreme tip edge.

12. A rotor blade as claimed in claim 4, wherein said droop surface is planar.

13. A rotor blade as claimed in claim 12, wherein said droop surface extends downwardly and outwardly from said first reference axis and at an angle of about 20 degrees.

14. A rotor blade as claimed in claim 4, wherein said droop surface is curved.

15. A rotor blade as claimed in claim 11, wherein the angle of sweep of the swept extreme tip edge is about 70 degrees from the blade feathering axis.

16. A helicopter rotor blade having a root end adapted during operation for attachment to a rotor head for rotation about a generally vertical axis to define a rotor rotational disc, a central portion extending from the root end and being of aerofoil section having leading and trailing edges and a chord dimension, a swept tip at the end of the central portion defining a blade span and including a swept extreme tip edge, characterised in that blade sections taken perpendicular to said swept extreme tip edge comprise aerofoil sections incorporating a predetermined swept extreme tip edge droop that determines the airflow characteristics about the swept tip to reduce aerodynamic pitching moments that occur due to spanwise flow encountered in the fore and aft sectors of the rotor disc during forward flight of a helicopter on which the rotor blade is fitted.

17. A helicopter rotor blade comprising a root end adapted for attachment to a rotor head for rotation, during operation, about a generally vertical axis so as to define a rotor rotational disc, a central portion extending from the root end and being of aerofoil section having leading and trailing edges and a chord dimension, a swept tip having a tip span dimension and located at the end of the central portion opposite the root end having a first leading edge portion extending forwardly from a junction with the leading edge of the central portion to a first point located forward of the leading edge of the central portion, a second leading edge portion swept rearwardly from the first point to a second point, a rearwardly swept extreme tip edge of higher sweep magnitude than the second leading edge portion and extending to a third point, a curved joining portion blending the second leading edge portion with said tip edge, and a rearwardly swept trailing edge extending from a junction with the trailing edge of the central portion to the third point, the swept tip having a chord dimension longer than the chord dimension of the central portion, and an outer area of the tip being progressively reduced in thickness towards the swept extreme tip edge, wherein the swept extreme tip edge incorporates blade droop extending partially through the tip span dimension and the tip chord dimension to reduce aerodynamic pitching moments originating from the swept extreme tip edge due to interaction between spanwise flow encountered in the fore and aft sectors of the rotor disc during forward flight of a helicopter on which the blade is fitted and local chordwise bound vortices over the swept extreme tip edge.

18. A rotor blade as claimed in claim 17, further characterised in that said second leading edge portion commences at about 0.87R blade station and said downwardly deflected swept extreme tip edge commences at about 0.95R blade station.

* * * * *